(12) United States Patent
Hagerott et al.

(10) Patent No.: US 10,960,971 B1
(45) Date of Patent: Mar. 30, 2021

(54) AUTOMATIC YAW ENHANCEMENT

(71) Applicant: Textron Aviation Inc., Wichita, KS (US)

(72) Inventors: Steven G. Hagerott, Wichita, KS (US); Philippe A. Ciholas, Sedgwick, KS (US)

(73) Assignee: Textron Innovation Inc., Providence, RI (US)

( * ) Notice: Subject to any disclaimer, the term of this patent is extended or adjusted under 35 U.S.C. 154(b) by 382 days.

(21) Appl. No.: 16/127,403

(22) Filed: Sep. 11, 2018

Related U.S. Application Data

(60) Provisional application No. 62/556,709, filed on Sep. 11, 2017.

(51) Int. Cl.
  *B64C 13/18* (2006.01)
  *G05D 1/08* (2006.01)
  *B64C 9/10* (2006.01)
  *B64C 13/04* (2006.01)

(52) U.S. Cl.
  CPC ............... *B64C 13/18* (2013.01); *B64C 9/10* (2013.01); *B64C 13/044* (2018.01); *G05D 1/0816* (2013.01)

(58) Field of Classification Search
  CPC ......... B64C 13/18; B64C 9/10; B64C 13/044; G05D 1/0816
  See application file for complete search history.

(56) References Cited

U.S. PATENT DOCUMENTS

| | | | |
|---|---|---|---|
| 4,392,203 A | 7/1983 | Fischer et al. | |
| 4,992,713 A | 2/1991 | McCollum et al. | |
| 5,170,969 A | 12/1992 | Lin | |
| 5,465,211 A | 11/1995 | Byrne, Jr. | |
| 8,620,492 B2 | 12/2013 | Hagerott et al. | |
| 8,874,286 B2 | 10/2014 | Hagerott et al. | |
| 10,583,910 B2 * | 3/2020 | Tao | B64C 13/18 |
| 2010/0102173 A1 * | 4/2010 | Everett | B60T 8/1703 244/175 |
| 2010/0168949 A1 * | 7/2010 | Malecki | G05D 1/0676 701/24 |
| 2012/0325977 A1 | 12/2012 | Giesseler | |

* cited by examiner

*Primary Examiner* — Valentina Xavier
(74) *Attorney, Agent, or Firm* — Erise IP, P.A.

(57) ABSTRACT

An automatic yaw enhancement method for an aircraft having at least one propeller includes providing to a flight controller a pilot command from a pilot interface and avionic data for an airspeed, an angle of attack, and a thrust. A P-factor compensation is determined based on one or more of the airspeed, the angle of attack, and the thrust. A command to a trim device is determined based on a P-factor compensation. When a rudder bias persists, the command to the trim device is repeatedly updated until a rudder force input is nullified. The methods provide automatic pilot assistance for controlling yaw during asymmetric flight conditions and automatic turn coordination while allowing intentional side-slip for facilitating crosswind landings.

8 Claims, 3 Drawing Sheets

AUTOMATIC YAW ENHANCEMENT

CROSS-REFERENCE TO RELATED APPLICATIONS

This application claims the benefit of U.S. Provisional Patent Application Ser. No. 62/556,709 entitled Automatic Yaw Enhancement and filed Sep. 11, 2017, the disclosure of which is herein incorporated by reference in its entirety.

BACKGROUND

1. Field

Embodiments of this disclosure relate generally to control of aircraft, and more specifically to automated rudder control systems and methods.

2. Description of the Related Art

U.S. Pat. Nos. 8,620,492 and 8,874,286 to Hagerott et al. disclose a system for damping an unstable dutch roll mode using ailerons, spoilers, a combination of ailerons and spoilers, and the combination of ailerons and spoilers in further combination with a classical yaw damper that uses the rudder. A damping signal is calculated based on at least one parameter of motion selected from the group consisting of lateral acceleration, sideslip angle, true airspeed, bank angle and yaw rate.

U.S. Pat. No. 5,465,211 to Byrne discloses a control system for a single propeller-driven aircraft that calculates a composite rudder trim signal based on measured aircraft data (e.g., engine torque, aircraft altitude, aircraft speed, and pitch rate, but not thrust) compared to flight-test data (e.g., provided in a lookup table). The composite rudder trim signal is used to automatically reduce rudder forces induced by throttling and gyroscopic effects produced in response to pilot commanded maneuvers, thereby maintaining the aircraft in coordinated flight.

U.S. Pat. No. 5,170,969 to Lin discloses an aircraft rudder command system for allowing a pilot to directly input a sideslip command for yaw-axis control using rudder pedals. Lin further discloses a system to limit sideslip based on a sideslip angle command and an aerodynamic state variable, such as dynamic pressure, impact pressure, and airspeed in conjunction with altitude.

U.S. Pat. No. 4,392,203 to Fischer et al. discloses an automatic flight control system that includes a yaw trim system that provides a yaw command signal based on a roll rate, a lateral acceleration, and a yaw trim command input for providing automatic coordinated turns particularly for helicopters.

U.S. Patent Publication 2012/0325977 to Giesseler discloses a method for reducing yawing motions of an aircraft in-flight by adjusting a spoiler and a regulating flap of the same airfoil such that the spoiler and regulating flap motions deflect in mutually opposite directions in a time segment to counteract yawing motion.

SUMMARY

In an embodiment, an automatic yaw enhancement method for an aircraft having at least one propeller is provided. The method includes providing to a flight controller a pilot command from a pilot interface and avionic data for an airspeed, an angle of attack, and a thrust. The method further includes determining a P-factor compensation based on one or more of the airspeed, the angle of attack, and the thrust; providing a command to a trim device based on the P-factor compensation; and determining a difference between a desired biased rudder position and an actual position. Until a rudder force input is nullified, the method repeats the steps of determining the P-factor compensation, providing the command to the trim device, and determining whether the rudder bias persists.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Embodiments of the present disclosure provide automatic pilot assistance for controlling yaw during asymmetric flight conditions. Conventionally, a pilot manually provides rudder commands (e.g., via rudder pedals) and commands for trimming yaw (e.g., via a trim tab or trim spring). Alternatively, yaw control is provided automatically (e.g., using an autopilot function). However, existing automated systems for controlling and trimming yaw typically rely on a complex map based on flight conditions and engine parameters, which may not account for all flight scenarios. To establish a rudder bias, existing systems command yaw based on differential engine power or engine torque, which may be incorrect because some failures affect thrust differently than power/torque, especially on multi-engine propeller aircraft.

Figure 1:
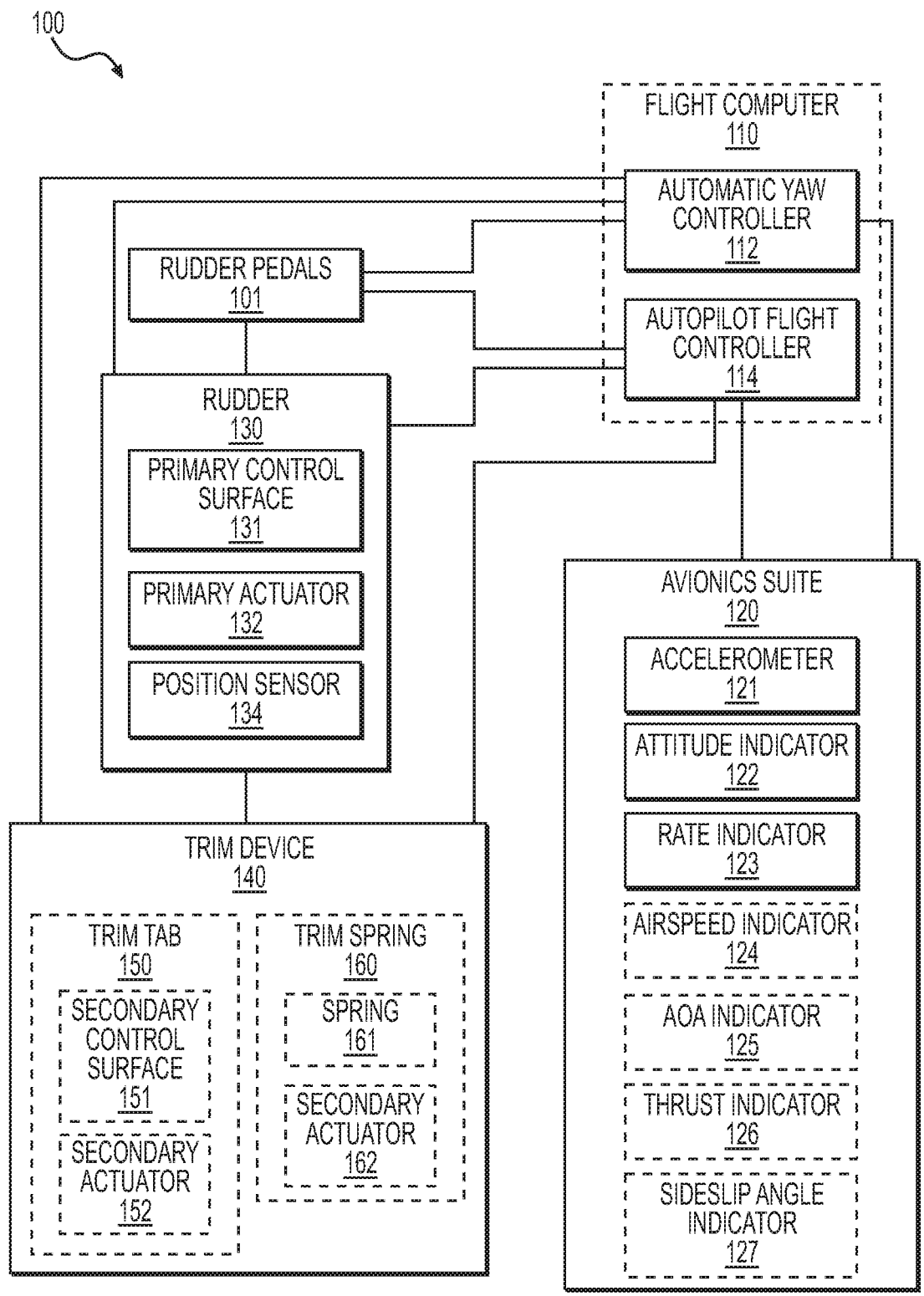
FIG. 1 is a block diagram showing an automatic yaw enhancement system, in an embodiment.

FIG. 1 is a block diagram showing an exemplary automatic yaw enhancement system 100. System 100 includes rudder pedals 101 for commanding a rudder 130. Specifically, a pilot provides an input command using rudder pedals 101 for altering the position of a rudder primary surface 131 (e.g., via mechanical linkage, actuator, servo, or some combination of these). System 100 includes an avionics suite 120 to provide measured aircraft parameters to a flight controller to determine the yaw motion of the aircraft and apply an appropriate rudder input, regardless of the cause of the yaw motion and without needing a complex interface with other aircraft systems, such as propulsion control.

In certain embodiments, the flight controller is an automatic yaw controller 112 configured for commanding rudder 130, as further described below. The automatic yaw controller 112 includes a memory, including a non-transitory medium for storing software, and a processor for executing instructions of software. Memory in some embodiments is a memory system that includes both transitory memory such as RAM and non-transitory memory such as, ROM, EEPROM, Flash-EEPROM, magnetic media including disk drives, and optical media. Memory stores software as machine readable instructions executable by processor. Automatic yaw controller 112 may optionally be part of a flight control computer 110 or a stand-alone controller (e.g., microcontroller). An autopilot flight controller 114 provides autopilot functions including rudder control and may also be part of flight computer 110 or stand alone. In certain embodiments, automatic yaw controller 112 is a subset of autopilot flight controller 114.

Avionics suite 120 includes sensors used for aircraft navigation, including an accelerometer 121, an attitude indicator 122, and a rate indicator 123. Accelerometer 121 may include three accelerometers oriented orthogonally along all three axes (e.g., X, Y, and Z axes). Rate indicator 123 measures rotational rates, and is for example, a gyroscope-based device that measures a rotational rate of aircraft motion in all axes to determine rates of yaw, pitch, and roll. For the purposes of automatic yaw enhancement system 100, avionics suite 120 may optionally include (as indicated by dashed lines in FIG. 1) an airspeed indicator 124, an angle of attack (AOA) indicator 125, a thrust indicator 126, and a sideslip angle indicator 127. Information from avionics suite 120 may be transmitted to automatic yaw controller 112 and autopilot flight controller 114 by a wired and/or wireless communication media.

Rudder 130 may include a primary control surface 131, a primary actuator 132, and a position sensor 134. Primary actuator 132 controls deflection of primary control surface 131 based on an input command from rudder pedals 101 and/or automatic yaw controller 112 and/or autopilot flight controller 114. Examples of primary actuator 132 include an electro-hydraulic servo valve (EHSV) and an electromechanical valve (e.g., solenoid valve). Position sensor 134 measures a position of primary control surface 131, such as a hinge angle in degrees from nominal. An example of position sensor 134 is a rotary variable differential transformer (RVDT).

A trim device 140 is mechanically coupled to rudder 130 and is used to trim primary control surface 131. When a persistent bias of primary control surface 131 is detected by position sensor 134, trim device 140 is activated to trim primary control surface 131. This alleviates the force required by primary actuator 132 while maintaining the persistent bias of primary control surface 131. Typically, primary actuator 132 operates rapidly and trim device 140 operates comparatively slowly to reduce the average load of primary actuator 132 to zero. Examples of trim device 140 include a trim tab 150 and a trim spring 160.

Trim tab 150 includes a secondary control surface 151 and a secondary actuator 152 for moving secondary control surface 151, thereby trimming primary control surface 131 via the aerodynamic force applied to secondary control surface 151. Alternatively, trim spring 160 uses a spring (e.g., a gas spring) to apply a biasing force to primary control surface 131 for maintaining primary control surface 131 in a biased position while reducing the average load of primary actuator 132 to zero. Trim spring 160 may further include a secondary actuator 162 (e.g., a screw-drive motor) for moving the center point of trim spring 160.

In operation, automatic yaw controller 112 uses aircraft acceleration from accelerometer 121, attitude from attitude indicator 122, and rate information from rate indicator 123 in all (X,Y,Z) axes to determine optimum rudder input to primary actuator 132 and trim device 135 for minimizing side-slip angle, yaw rate, and/or lateral acceleration depending on a flight or a ground condition. Automatic yaw controller 112 may be configured to perform additional operations. For example, integration of Ny (e.g., yawing moment) may be performed to provide automatic trimming via trim device 135. In another example, sideslip may be estimated based on inertial parameters and true airspeed and used to provide feedback for rapid turn coordination and engine-out compensation (e.g., when one engine fails, especially during takeoff). In yet another example, automatic yaw controller 112 may use airspeed, angle of attack, or pitch rate to schedule an initial P-factor compensation and provide feedback for re-trimming the rudder. These examples are further described below in connection with Methods 200, 300, and 400.

Figure 2:
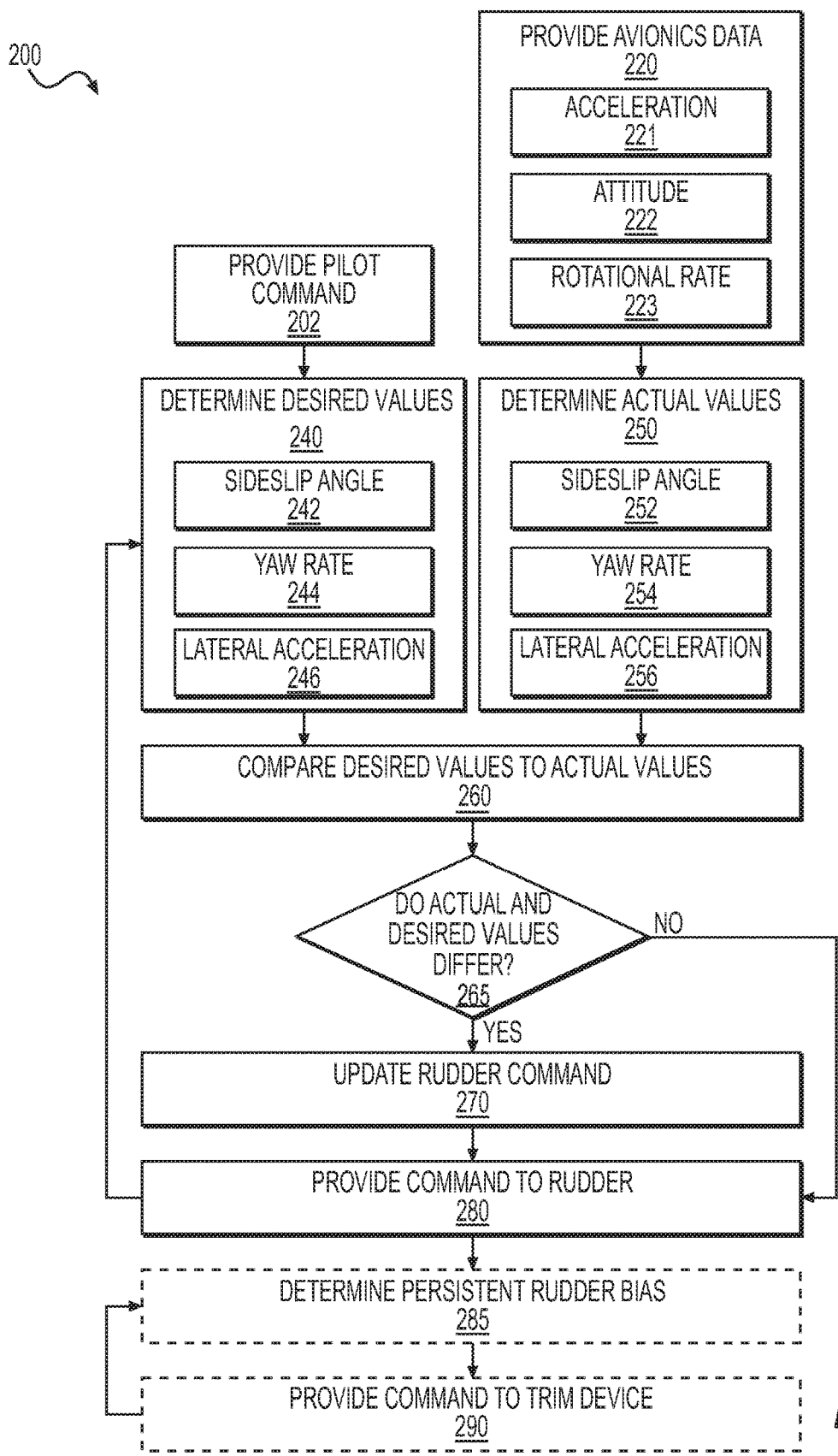
FIG. 2 is a block diagram showing an automatic yaw enhancement method, in an embodiment.

FIG. 2 is a block diagram showing an exemplary automatic yaw enhancement method 200. Method 200 may be performed according to the steps described below using system 100, FIG. 1, for example. Method 200 provides a versatile way to improve aircraft control on the ground and in the air, which may be beneficial for both single and multiengine aircraft. Steps of method 200 may be performed in the order described below or in a different order without departing from the scope hereof.

In a step 202, a pilot command is provided. In an example of step 202, the pilot provides a command signal for steering the aircraft via pilot interface 101, FIG. 1.

In a step 220, avionics data is provided. In an example of step 220, avionics suite 120 provides data to automatic yaw controller 112. Data provided in step 220 may include one or more of an acceleration 221, an attitude 222, and a rotational rate 223. Rotational rate 223 may include rotational rates in yaw, pitch, and roll axes.

In a step 240, desired values of aircraft motion are determined. In an example of step 240, automatic yaw controller 112 determines desired values of aircraft motion based on pilot commands provided in step 202. Desired values of aircraft motion include desired sideslip angle 242, desired yaw rate 244, and desired lateral acceleration 246.

In a step 250, actual values of aircraft motion are determined. In an example of step 250, automatic yaw controller 112 determines actual values of aircraft motion based on avionics data provided in step 220. Actual values of aircraft motion include actual sideslip angle 252, actual yaw rate 254, and actual lateral acceleration 256. Actual sideslip angle 252 may be determined based on avionics data provided in step 220, or it may be measured directly using optional sideslip angle indicator 127, FIG. 1.

In a step 260, desired values of aircraft motion are compared to actual values of aircraft motion. In an example of step 260, desired values determined in step 240 are subtracted from actual values determined in step 250 to determine the magnitude and direction of the differences, and determine when automatic yaw enhancement is needed.

Step 265 is a decision. If in step 265, automatic yaw controller 112 determines that the actual values of aircraft motion differ from the desired values of aircraft motion by more than a threshold value or a set of threshold criteria, method 200 proceeds with step 270. Otherwise, method 200 proceeds directly to step 280. One or more predetermined threshold criteria can be used to determine if the difference between desired and actual yaw behavior requires correction and whether a primary rudder command or a secondary (trim) command, or both are required. In certain embodiments, the predetermined threshold is evaluated for a predetermined duration for determining if the actual and desired values of aircraft motion differ (e.g., to avoid false trips due to signal noise from avionics data of step 220).

In a step 270, a rudder command is updated. In an example of step 270, automatic yaw controller 112 updates a command input to rudder servo 132 for controlling rudder 130 based on comparison of desired and actual values of aircraft motion as determined in step 265.

In certain embodiments, a P-factor compensation may be added in step 270 as a direct path into the rudder command, which serves to remove a P-factor effect (see description of method 300 in connection with FIG. 3, below). Under this circumstance, the rudder command update would not be based on the comparison between desired and actual values but would instead be a direct compensation based on the pitch rate and airspeed values used in method 300 for P-factor compensation.

In a step 280, a command is provided to the rudder. In an example of step 280, pilot command 202 is provided to rudder 130. In the case where the actual and desired values of aircraft motion differ, the updated rudder command from step 270 is provided to rudder 130. In the case where the actual and desired values of aircraft motion do not substantially differ (e.g., the difference is below a predetermined threshold value), the original pilot command from step 202 is provided to rudder 130 without modification.

A feedback from the rudder command may be provided to automatic yaw controller 112, and steps 240 through 280 are repeated. In this way, a feedback loop serves to progressively minimize the difference between actual and desired values of aircraft motion. In certain embodiments, the feedback loop is a proportional-integral-derivative (PID) control loop.

In an optional step 285, a persistent rudder bias is determined. In an example of step 285, automatic yaw controller 112 determines that a persistent rudder bias is present.

In an optional step 290, a command is provided to the trim device. In an example of step 290, automatic yaw controller 112 provides a command to trim tab 150 for trimming rudder 130 according to the persistent rudder bias determined in step 285.

A feedback from the trim device is provided to automatic yaw controller 112, and step 285 is repeated to reevaluate the rudder bias. In this way, a feedback loop serves to progressively minimize a force input. In other words, the feedback loop reduces the force required by the pilot or actuator driving the main control surface (e.g., the rudder). In certain embodiments, the feedback loop is a PID control loop.

Advantages provided by method 200 include providing optimum rudder position and trim inputs to meet yaw requirements regardless of flight condition. Method 200 alleviates pilot activity related to trimming in yaw, in effect providing automatic trim in the yaw axis, including when a rudder bias is present. Method 200 also assists the pilot in significant asymmetric events such as One-Engine-Inoperative flight, uneven thrust, or reverse thrust (e.g., during ground stopping). Additionally, method 200 assists the pilot by compensating for undesirable yawing moments that may be transiently induced by pitch/yaw coupling. Method 200 also monitors pilot commands for a desired flight path and determines rudder input accordingly, thereby assisting and not fighting pilot commands. In this way, method 200 provides automatic turn coordination and allows intentional side-slip, such that crosswind landings may be facilitated.

Figure 3:
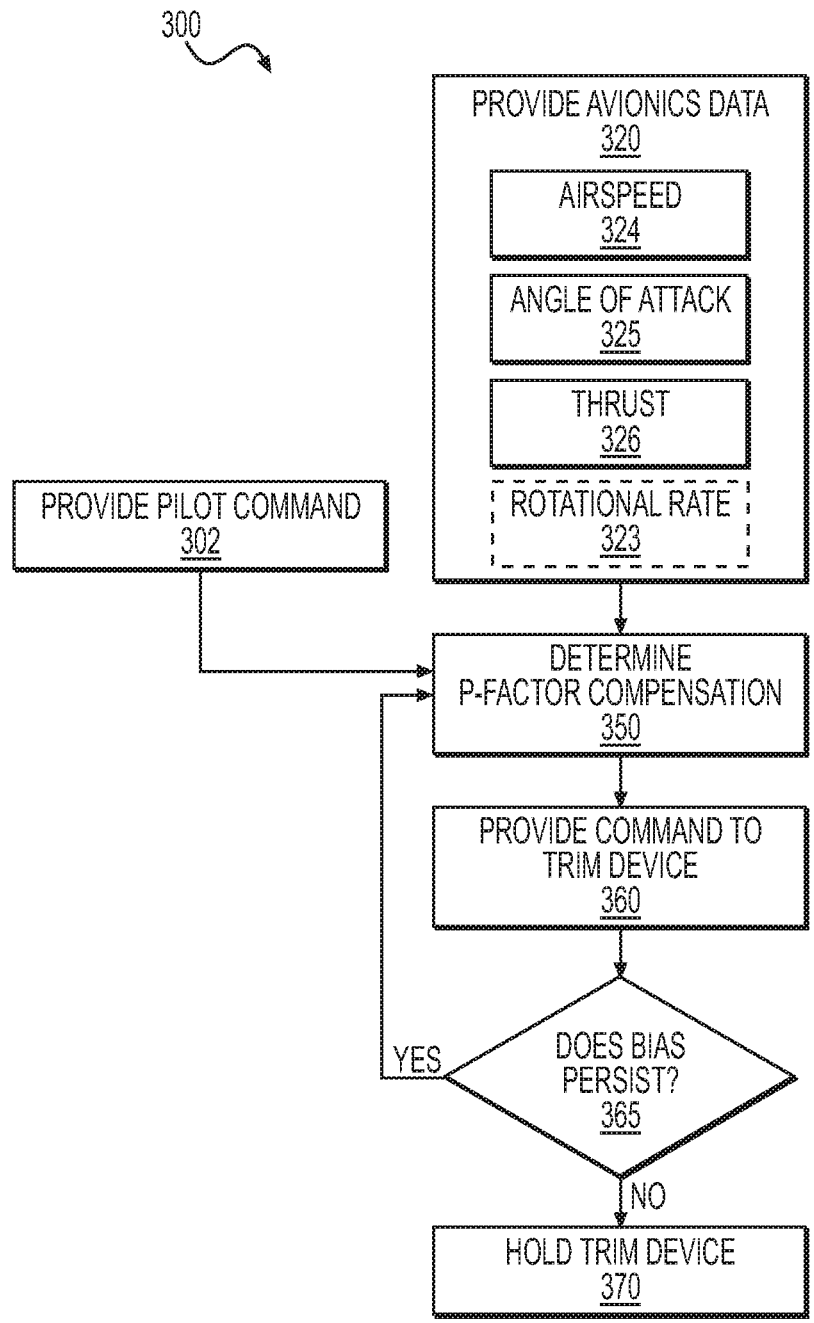
FIG. 3 is a block diagram showing an automatic yaw enhancement method for P-factor compensation, in an embodiment.

FIG. 3 is a block diagram showing an exemplary automatic yaw enhancement method 300 for providing P-factor compensation. P-factor is an asymmetrical relocation of a propeller's center of thrust that may occur when the aircraft is at a high angle of attack, which exerts a yawing moment on the aircraft. Method 300 may be performed according to the steps described below using system 100, FIG. 1, for example. Steps of method 300 may be performed in the order described below or in a different order without departing from the scope hereof.

In a step 302, a pilot command is provided. In an example of step 302, the pilot provides a command signal for steering the aircraft via pilot interface 101, FIG. 1.

In a step 320, avionics data is provided. In an example of step 320, avionics suite 120 provides data to automatic yaw controller 112. Data provided in step 320 may include one or more of airspeed 324, angle of attack 325, thrust 326, and optionally, rotational rate 323. Rotational rate 323 may include rotational rates in yaw, pitch, and roll axes.

In a step 350, a P-factor compensation is determined. In an example of step 350, automatic yaw controller 112 determines P-factor compensation based on airspeed, estimated angle of attack, or pitch rate to schedule an initial (anticipating) compensation for P-factor.

In a step 360, a command is provided to a trim device. In an example of step 360, a command is sent to trim device 140 based on the P-factor compensation determined in step 350.

A step 365 is a decision, if in step 365 a rudder bias persists, feedback is sent to step 350. This feedback loop handles any remaining re-trimming of the rudder that may be necessary to reduce or nullify any force input to the rudder. In certain embodiments, the feedback loop is a PID control loop.

If a rudder bias does not persist, method 300 proceeds to step 370.

In a step 370, a trim device is held steady. In an example of step 370, trim tab 150 is held steady for trimming rudder 130.

Automatic yaw enhancement methods 200 and 300 may be applied to many types of flight control systems. In one embodiment, methods 200 and 300 are applied to a manually controlled rudder (e.g., a mechanical linkage connects rudder pedals 101 to the rudder 130) that also has an autopilot servo coupled to primary actuator 132. During autopilot operation, autopilot flight controller 114 implements the method and actuates primary actuator 132 via the autopilot servo to supply a portion of the force required to hold primary control surface 131 in a biased position, thereby assisting the pilot. During manual portions of the flight, automatic yaw controller 112 may use the autopilot servo to provide a pilot-assist. Trim device 140 may be configured to trim rudder 130 for pilot assistance under control of automatic yaw controller 112, or for automatic trim under control of autopilot flight controller 114 during autopilot phases of flight.

In another embodiment, automatic yaw controller 112 or autopilot flight controller 114 may implement methods 200 and 300 in a control system with a hydro-mechanical boost via primary actuator 132, in which rudder pedals 101 provide commands to primary actuator 132 via mechanical linkage, while primary actuator 132 provides a portion of the required force to aid the pilot. Due to the mechanical linkage, feedback from the aerodynamic force on primary control surface 131 is felt by the pilot through rudder pedals 101. The assisting hydraulic system shares control loads with the pilot under control of automatic yaw controller 112 to provide a pilot-assist. During autopilot operation, autopilot flight controller 114 may provide automatic rudder operation via the autopilot servo. Rudder trim may also include pilot assist capability.

For a fully-powered rudder control system that is irreversible (e.g., no mechanical force feedback to the pilot), rudder pedals 101 provide commands to primary actuator 132 via mechanical linkage, while primary actuator 132 provides the entire force required with no feedback returned to the pilot. Automatic yaw controller 112 or autopilot flight controller 114 implements methods 200 and 300 with a fully powered hydro-mechanical actuation of primary control surface 131. During autopilot operation, autopilot flight controller 114 may provide automatic rudder operation via the autopilot servo. Rudder trim may also include pilot assist capability.

For a computer-controlled, fully-powered rudder control system (e.g., a fly-by-wire system), autopilot and trim functions are inherently included. Signals are transmitted from the pilot input device (e.g., rudder pedals 101) to the primary actuator 132 and trim device 140 without a mechanical linkage. As such, automatic yaw controller 112 or autopilot flight controller 114 implement methods 200 and 300 to provide inputs to rudder 130 and trim device 140 for fully automatic trimming. In an embodiment, a rudder servo torque may be monitored by automatic yaw controller 112 over time to detect a persistent rudder servo torque. Accordingly, adjustment to rudder commands and/or to trim commands may be made to provide a null persistent rudder servo torque.

In yet another embodiment, method 300, FIG. 3 may be combined in parallel with method 200, FIG. 2 such that the resulting aircraft response is closer to a desired response. Alternatively, method 300 may be incorporated into step 240 of FIG. 2 to account for P-factor compensation in the desired values of aircraft motion.

Advantages of method 300 (or the combination of methods 200 and 300) include an ability to compensate for engine thrust as opposed to engine torque since engine torque may not equate to thrust in certain conditions, especially abnormal cases. For example, for a multi-engine aircraft performing a rudder-bias compensation, an abnormal powerplant failure condition may be compensated using method 300 (or the combination of methods 200 and 300) because the actual aircraft response is determined regardless of the nature of any abnormal event that occurred. In other words, the proposed methods are able to compensate for abnormal behaviors better than a method that presumes certain engine parameters will result in specific aircraft responses, compensation of which may result in unhelpful or upsetting yaw inputs in some circumstances.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all operations listed in the various figures need be carried out in the specific order described.

We claim:

1. An automatic yaw enhancement method for an aircraft having at least one propeller, comprising:
    providing to a flight controller:
        a pilot command from a pilot interface; and
        avionic data for an airspeed, an angle of attack, and a thrust;
    determining a P-factor compensation based on one or more of the airspeed, the angle of attack, and the thrust;
    providing a command to a trim device based on the P-factor compensation;
    determining whether a rudder bias persists; and
    repeating, until a rudder force input is nullified, the steps of determining the P-factor compensation, providing the command to the trim device, and determining whether the rudder bias persists.

2. The automatic yaw enhancement method of claim 1, wherein providing avionic data to the flight controller further comprises providing rotational rates for yaw, pitch, and roll.

3. The automatic yaw enhancement method of claim 1, further comprising providing to the flight controller, if the rudder bias persists, a feedback based on the command to the trim device for determining the P-factor compensation.

4. The automatic yaw enhancement method of claim 1, further comprising holding the trim device steady for assisting the pilot when the rudder force input has been nullified.

5. The automatic yaw enhancement method of claim 1, further comprising actuating a primary actuator via an autopilot servo for providing a portion of a force to hold the rudder in a biased position for assisting the pilot.

6. The automatic yaw enhancement method of claim 1, further comprising providing a hydro-mechanical boost for assisting the pilot via a primary actuator in which rudder pedals provide commands to the primary actuator via a mechanical linkage and the primary actuator provides a portion of a force required to move or hold the rudder.

7. The automatic yaw enhancement method of claim 1, further comprising providing the pilot command to a primary actuator via a mechanical linkage, wherein the primary actuator provides an entire force required without feedback returned to the pilot.

8. The automatic yaw enhancement method of claim 1, further comprising detecting a persistent rudder servo torque and adjusting the command to the trim device until the persistent rudder servo torque is nullified.

\* \* \* \* \*